(12) United States Patent
Postal (10) Patent No.: US 9,584,368 B2
(45) Date of Patent: Feb. 28, 2017

(54) SYSTEM AND METHOD FOR CONTROLLING THE TRIGGER AND EXECUTION OF MANAGEMENT POLICIES

(71) Applicant: SAMSUNG ELETRÔNICA DA AMAZÔNIA LTDA., Manaus-Am (BR)

(72) Inventor: Antonio Henrique Barbosa Postal, Campinas (BR)

(73) Assignee: SAMSUNG ELETRÔNICA DA AMAZÔNIA LTDA., Campinas-São Paulo (BR)

( * ) Notice: Subject to any disclaimer, the term of this patent is extended or adjusted under 35 U.S.C. 154(b) by 193 days.

(21) Appl. No.: 14/068,762

(22) Filed: Oct. 31, 2013

(65) Prior Publication Data
US 2015/0019699 A1    Jan. 15, 2015

(30) Foreign Application Priority Data

Jul. 12, 2013 (BR) .......................... 1020130179418

(51) Int. Cl.
*H04L 12/24* (2006.01)
(52) U.S. Cl.
CPC ....... *H04L 41/0893* (2013.01); *H04L 41/0681* (2013.01)
(58) Field of Classification Search
CPC .................................................. H04L 41/0681
See application file for complete search history.

(56) References Cited

U.S. PATENT DOCUMENTS

| | | | | |
|---|---|---|---|---|
| 6,463,470 B1* | 10/2002 | Mohaban | ............ | H04L 12/5695 709/223 |
| 7,574,425 B2* | 8/2009 | Taylor | ............... | G06F 17/30306 |
| 7,912,804 B1* | 3/2011 | Talwar | .................... | G06Q 10/06 706/47 |
| 8,010,842 B2* | 8/2011 | Krivopaltsev | ...... | H04L 41/0681 714/26 |
| 8,020,157 B2* | 9/2011 | Alnas | ........................ | G06F 8/60 717/168 |
| 8,180,927 B2* | 5/2012 | Hallamaa | ................ | G06F 9/466 710/5 |
| 8,392,531 B2* | 3/2013 | Keum | .................... | G06F 15/163 700/1 |
| 8,434,094 B2* | 4/2013 | He | ....................... | H04L 41/0681 717/120 |
| 8,458,301 B1* | 6/2013 | Andrus | ............... | H04L 41/0816 709/220 |
| 8,655,337 B2* | 2/2014 | Sherlock | ................. | H04L 41/08 455/418 |
| 8,671,226 B2* | 3/2014 | Hallamaa | ................ | G06F 9/466 710/5 |
| 8,700,028 B2* | 4/2014 | Harris | ................. | H04L 12/2697 455/419 |
| 2003/0027581 A1* | 2/2003 | Jokinen | ................... | H04W 8/04 455/456.1 |

(Continued)

Primary Examiner — Lashonda Jacobs
(74) Attorney, Agent, or Firm — Staas & Halsey LLP (57) ABSTRACT

A remote management system includes a server and multiple devices operating in accordance with management policies based on conditions and actions, and a method for triggering and controlling the execution of these management policies. The method and system extend MgmtPolicyMO in order to make it more flexible and efficient, focusing more specifically on the functionality of the actions of management policy.

9 Claims, 4 Drawing Sheets (56) References Cited

U.S. PATENT DOCUMENTS

| | | | | |
|---|---|---|---|---|
| 2004/0082346 A1* | 4/2004 | Skytt | H04W 24/02 | 455/456.3 |
| 2005/0096016 A1* | 5/2005 | Tervo | H04L 67/303 | 455/414.1 |
| 2005/0267765 A1* | 12/2005 | Jeng | G06Q 10/10 | 705/7.41 |
| 2008/0163262 A1* | 7/2008 | He | H04W 8/245 | 719/321 |
| 2009/0049518 A1* | 2/2009 | Roman | H04L 41/0893 | 726/1 |
| 2009/0228606 A1* | 9/2009 | McCarthy | H04L 67/1097 | 709/248 |
| 2009/0307172 A1* | 12/2009 | McMurtry | G06Q 10/06 | 706/47 |
| 2009/0327908 A1* | 12/2009 | Hayton | G06F 21/6218 | 715/744 |
| 2010/0318701 A1* | 12/2010 | Srinivasan | G06Q 10/10 | 710/104 |
| 2011/0087917 A1* | 4/2011 | He | H04L 41/0681 | 714/2 |
| 2012/0003983 A1* | 1/2012 | Sherlock | H04L 41/08 | 455/450 |
| 2013/0040604 A1* | 2/2013 | Sprigg | H04L 51/12 | 455/410 |
| 2013/0086237 A1* | 4/2013 | Cutler | H04L 41/0893 | 709/223 |
| 2013/0347003 A1* | 12/2013 | Whitmore | G06Q 10/06 | 718/108 |
| 2015/0142948 A1* | 5/2015 | Szabo | H04L 41/0893 | 709/224 |

* cited by examiner

SYSTEM AND METHOD FOR CONTROLLING THE TRIGGER AND EXECUTION OF MANAGEMENT POLICIES

CROSS-REFERENCE TO RELATED APPLICATIONS

This application claims the priority benefit of Brazilian Application No. 10 2013 017941 8, filed Jul. 12, 2013, in the Brazil National Institute of Industrial Property, the disclosure of which is incorporated herein by reference.

BACKGROUND

1. Field

The following description relates to a remote management system comprising a server and multiple devices operating in accordance with management policies based on conditions and actions. Furthermore, the disclosure relates to a method to trigger and control the execution of actions of management policies.

2. Description of the Related Art

In the context of the present disclosure, the term "Management Policy", or simply "Policy" is herein defined as a rule that describes the management actions of a device to be taken when certain predefined conditions are met by the device.

The term management policy management object, MgmtPolicyMO, enables remote operations for devices according to predefined management policies installed ("downloaded") by the management authority. The MgmtPolicyMO specifies the capabilities to perform actions on management policies such as installing, removing, upgrading, activating, and deactivating policies.

In order to provide a thorough understanding of the state of the art the following references are incorporated in their entirety:

1) OMA Device Management Version 1.3. Open Mobile Alliance, URL:
http://www.openmobilealliance.org;
2) "OMA Device Management Protocol, Version 1.3". Open Mobile Alliance, OMA-TS-DM-Protocol-V1_3, URL:
http://www.openmobilealliance.org;
3) "OMA Device Management Tree and Description, Version 1.3". Open Mobile Alliance, OMA-TS-DM-TND-V1_3, URL:
http://www.openmobilealliance.org; and
4) "OMA Diagnostics and Monitoring Version 1.2". Open Mobile Alliance, OMA-TS-DM-TND-V1_3, URL:
http://member.openmobilealliance.org/ftp/Public_documents/DM/DiagMon/Permanent_documents/OMA-TS-DiagMonTrapMOFrame-V1_2-20121121-C.zip.

Figure 2:
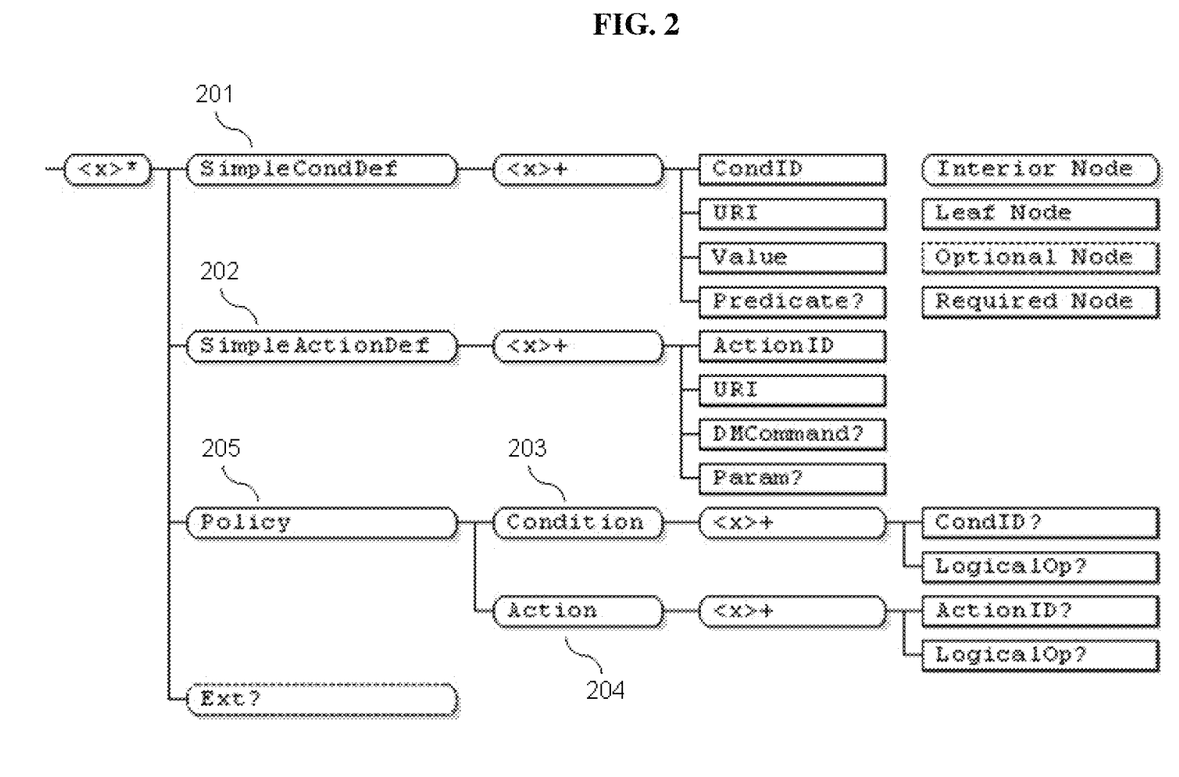
FIG. 2 shows an example of an instance of the management policy management object, MgmtPolicyMO, known in the prior art.

As known to those skilled in the art from the presentation held on Apr. 12, 2012 at OMA FORUM by Kong Posh Bhat, entitled: "Management Policy Framework", available at: http://member.openmobilealliance.org/ftp/Public_documents/DM/2012/OMA-DM-2012-0042-INP_Management-_Policy_Framework.zip for members forum, the MgmtPolicyMO provides the following skills:

Ability to specify a simple condition, using predicates (equal to, greater than, less than, etc.) (201).

Ability to specify a simple action (202).

Ability to combine simple conditions using logical operators (AND, OR, NOT, etc.) to define a compound condition (203).

Ability to combine simple actions using logical operators (AND, OR, NOT, etc.) to define a compound action (204). Examples considering the results of two simple actions:
Success and failure=failure
Success or Failure=Success Ability to specify management policies (205) in terms of compound conditions and compound actions.

Capacity of the device to continually evaluate the policies and actions triggered if the conditions are met.

The device must also issue a general warning to the server that contains the aggregate result or the status of the action taken, if any.

An example of management policy is presented below:

"Between 9:00 and 10:30 a.m. or 3:00 and 5:00 p.m., turn off the camera and put the phone on vibrate mode."

In this hypothetical example, we have the following conditions and actions:
Time>=9:00 a.m. {simple condition}
Time<=10:30 a.m. {simple condition}
Time>=3:00 p.m. {simple condition}
Time<=5:00 p.m. {simple condition}
Time>=9:30 a.m. and time<=10:30 a.m.) OR (time>=3:00 p.m. and time<=5:00 p.m) {compound condition}
disabling camera {simple action}
putting the phone on vibrate {simple action}
to turn off the camera and putting the phone on vibrate mode {compound action}

Figure 4:
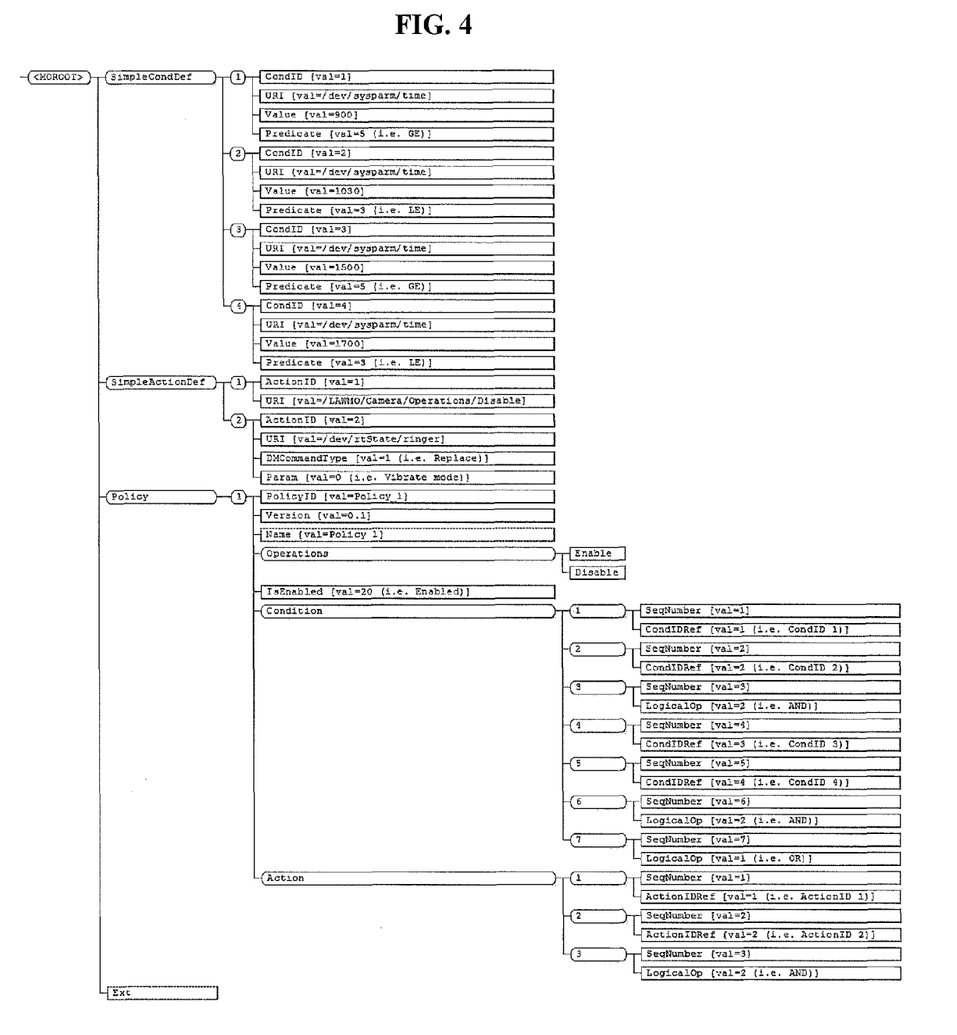
FIG. 4 shows an example of a management policy for a given hypothetical scenario based on the MgmtPolicyMO extended management tree described in FIG. 3.

This example can be described as an instance of Management Policy in MO tree in FIG. 4, as will be detailed below.

DiagMonTrapMOFrame OMA enabler specification OMA-TS-DiagMonTrapMOFrame-V1_2 [4] describes a Framework for Monitoring and Diagnosing network services, applications, devices, faults in devices and specifies an object "Trigger". The object Trigger DiagMonTrapMOFrame is dedicated to networking events and devices.

The patent document WO2010016849, "Intelligent Mobile Device Management Client", applicant InnoPath Software Inc, published on Feb. 11, 2010, proposed within OMA-DM autonomous management functions based on policies dynamically configured by the server, including conditions and actions. However, these functions are limited to each of the simple conditions, being able to trigger an action or simple list of actions. That is, it provides the flexibility of using compound conditions, each of which consists of many simple conditions connected by logical operators (AND, OR, NOT). Furthermore, this document WO2010016849 does not provide using compound actions each one consisting of many simple actions connected by logical operators (AND, OR, NOT) to determine the compound score, or even simple actions connected by "short circuit" control operators (SAND, SOR). This document WO2010016849 does not provide that Trigger acts on result transitions of compound conditions. The document WO2010016849 does not provide the possibility to schedule actions "If" and "Else" (positive and negative actions) based on the result of the transition conditions. The document WO2010016849 does not provide interconnecting the Policy—a Policy being able to enable or disable another. Finally, the document WO2010016849 does not define how policies, conditions and actions can be represented in a structured way, in the Management Tree ("Management Tree") in terms of objects ("Management Objects").

Patent documents US2008163262 and US2011087917, "Method and apparatus for Implementing a predetermined operation in device management", applicant: Huawei Tech Co Ltd, published on Jul. 3, 2008 and Apr. 14, 2011, incorporated into autonomous management functions OMA-DM based on policy dynamically configured by the server, composed of trigger and operations. However, the document US2008163262 and US2011087917 are limited to a specific scenario, in which a second preset operation is executed depending on the outcome of the former. Documents US2008163262 and US2011087917 does not have the flexibility of setting up the management policies made of composed conditions and actions.

OMA DM and Device Management Protocol [2] were conceived based on the approach in which the DM Server needs to query devices for configuration and status before sending them requests ("requests") DM, within a management session.

Figure 1:
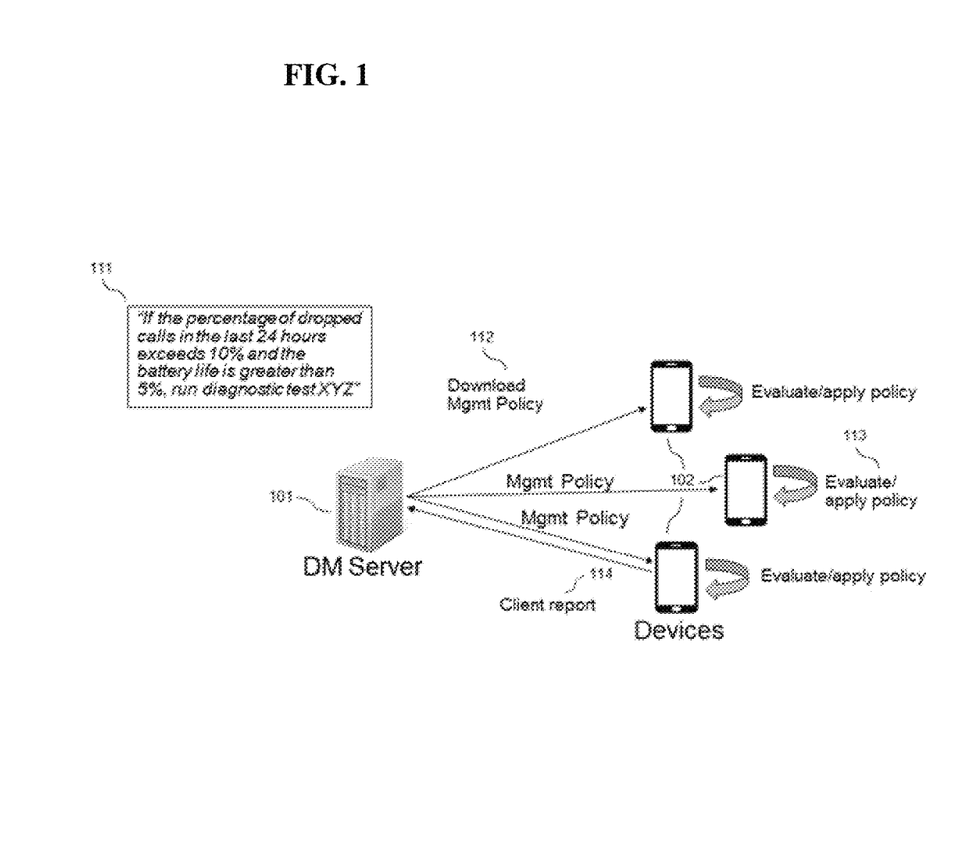
FIG. 1 shows the main features of MgmtPolicyMO including: a) DM Server installs ("download") Management Policy in Devices b) devices that assess pre-defined management policies and if the conditions are met, autonomously, take management actions, and c) devices that send notifications for DM Server, containing the result actions or status.

FIG. 1 shows the main features of MgmtPolicyMO. MgmtPolicyMO describes a more proactive approach, where devices are able to perform autonomous management actions based on management policy, as shown in FIG. 1. These policies are pre-set by the Management Authorities, typically Operators (operation 111) and installed ("downloaded") by DM Server (101) in Devices (102) (operation 112). Then, the devices continuously assess policies and make necessary management actions (operation 113). Once the conditions of the policy management are met, DM actions are triggered. Examples of actions: 1) management of software, 2) firmware updating, 3) updating parameter configuration and 4) initiating a diagnostic procedure. After execution, the results are sent to the Policy DM Server, using a notification mechanism (operation 114).

FIG. 2 shows a representation of MgmtPolicyMO as described in the technical specification of the management policy management object published on Jun. 26, 2013. The design of the Management Object ("Management Objects" or MO) adheres to the Device Management Tree ("Tree Management") and description OMA-DM.

In the current state of the art, MO MgmtPolicy can now offer savings for operators, because the Policy Management can be defined once and then transferred in a multitude of devices. It is, then, up to the device the burden of evaluating the policy and implement management actions proactively as needed. Only the results of actions are reported to the Policy DM Server, through a generic alert mechanism. In other words, if there is no need for management action, nothing is reported to the DM Server.

Based on the particularities described in the art, the methods proposed by the present disclosure enhance the benefits offered MgmtPolicyMO, as follows:

At the Device Side:

Policy actions can be triggered based on the results of transitions and not based on the results of the action. This reduces the burden of the device to evaluate and implement management actions frequently. The use of short-circuit operators can prevent unnecessary execution of simple actions based on the results of other simple actions previously performed within the same compound action.

At the Server Side:

Greater reduction in traffic in the communication between the device and the DM Server, and greater benefit in network costs: control of the policy trigger will reduce the frequency with which the DM Server is notified and prevent the server is interrupted by notifications excessively frequent, if compared to the prior art communications. Accordingly, the network cost savings is increased. Furthermore, the present disclosure reduces overhead of the server in processing repeated notifications. In other words, operators will be able to manage a larger number of devices that use the same infrastructure—DM Server capacity and network capacity, compared with the known solutions.

At the Perspective of Management Authorities:

Authorities, such as operators, have greater flexibility and modularity in policy management when compared with prior art solutions, thanks to:

Using short-circuit operators with greater control over the execution of the Device Policies.

Use of if-else actions, or actions made positive-negative, contributing to the increased flexibility of the specification of the Policy and respective implementation of its actions.

interconnected Management Policies, i.e., certain policy actions are able to activate and deactivate the evaluation and implementation of other policies, which allows reuse of policies in a more modular and flexible way.

Despite MgmtPolicyMO known in the prior art overcome important limitations for device management, proposing a more pro-active management of standalone devices, there are some gaps and opportunities for improvement, in particular on the implementation of the policy action. The present disclosure seeks to overcome these drawbacks and to meet these gaps by proposing specific methods to cover each of these identified gaps.

SUMMARY

Additional aspects and/or advantages will be set forth in part in the description which follows and, in part, will be apparent from the description, or may be learned by practice of the invention.

The method and system of the present disclosure extend MgmtPolicyMO in order to make it more flexible and efficient, focusing more specifically on the functionality of the actions of the management policy:

How the execution of every single action that forms the compound action can be controlled so that the execution of a single action may depend on the results of previous simple actions.

How to avoid repetitive executions of compound action and excessive notifications that are sent to the DM Server, by creating "Triggers" conditions based on the result of the transition condition.

How to some compound actions can be trigged based on positive transitions of the assessment (clause "IF"), whereas other composed conditions transitions can be triggered by negative assessment (clause "ELSE").

How a political management action can control other management policies, allowing linked management policies.

Problems to be Solved by the Invention

Problem 1—Limited Execution to any or all of the Simple Actions within a Compound Action According to an embodiment of the disclosure, a compound action, which is composed of simple actions connected by logical operators (NOT, AND, OR) uses the individual result of simple action results to determine the compound score to be notified to DM Server. Normally, all simple actions are performed, such as a sequential list of actions, before having their results evaluated logically. Besides being able to specify the execution of an action list, the Management Authority would also desire the flexibility to define simple actions to be performed based on the results of other simple actions, for example, the execution of an action B may depend on the result of an action A previously executed.

Example 1: Installing software (action A) and restart the phone (action B)—Management may Authority may desire to specify a policy in which the action B would be executed only if the action succeed (OK).

Example 2: To safe battery energy, turning off the Bluetooth function (action A) or, in case of failure, turning off the Wi-Fi connection (action 2)—Management Authority may desire to set a policy in which the action B would be performed only if the action A failed (NOK).

The management authority should have the option to choose whether all simple actions must be done sequentially, as in a list or in a controlled structure as above.

Problem 2—Repetitive Execution of Compound Actions

Each set policy enabled by MgmtPolicy MO should be frequently assessed. It turns out that frequent evaluations and successive policies, in which the conditions are met, it can lead to undesirable repetitive executions of compound actions and hence repetitive multiple notifications being sent to the DM Server. This can cause undesired problems such as processing overhead on the device and the server, and unnecessary network traffic.

The Management Authority may desire to have the flexibility to filter multiple actions of Policy actions. The filtering criteria can consider only the transitions of the results of consecutive measurements of each policy: the executions of compound action can be configured to be triggered by "Triggers" on positive transitions of the result of the compound condition (e.g., from false to true) or vice-versa.

Problem 3—Lack of an "If-Else" Scheme for Compound Actions

If the "Trigger" based on result transitions is enabled, the Management Authority may desire to have the flexibility to set different compound actions for positive transitions (from false to true) and for negative transitions (from true to false).

In other words, the policies can implement a logical scheme IF-ELSE, in which it can be defined positive and negative actions separated by policy.

Problem 4—Management Policies are Isolated and Cannot be Interconnected.

The MgmtPolicy MO was originally defined based on isolated, independent management policies. The Management Authority may benefit from a policy scheme more scalable, reusable, modular, inter-dependent, where a policy may be interconnected to another.

One possible use case would be a higher level authority being able to set the broader policies that can control (enable-disable) more specific policies or policies of subordinate authority.

BRIEF DESCRIPTION OF THE DRAWINGS

The objectives and advantages of the disclosure will become apparent from the following detailed description of non-limiting examples and figures presented in this disclosure.

DETAILED DESCRIPTION

Reference will now be made in detail to the embodiments, examples of which are illustrated in the accompanying drawings, wherein like reference numerals refer to like elements throughout. The embodiments are described below to explain the present invention by referring to the figures.

Based on the above teachings, the present disclosure proposes a differentiated and innovative method to extend MgmtPolicyMO in order to make it more flexible and efficient, focusing more specifically on the functionality of the actions of management policy.

Figure 3:
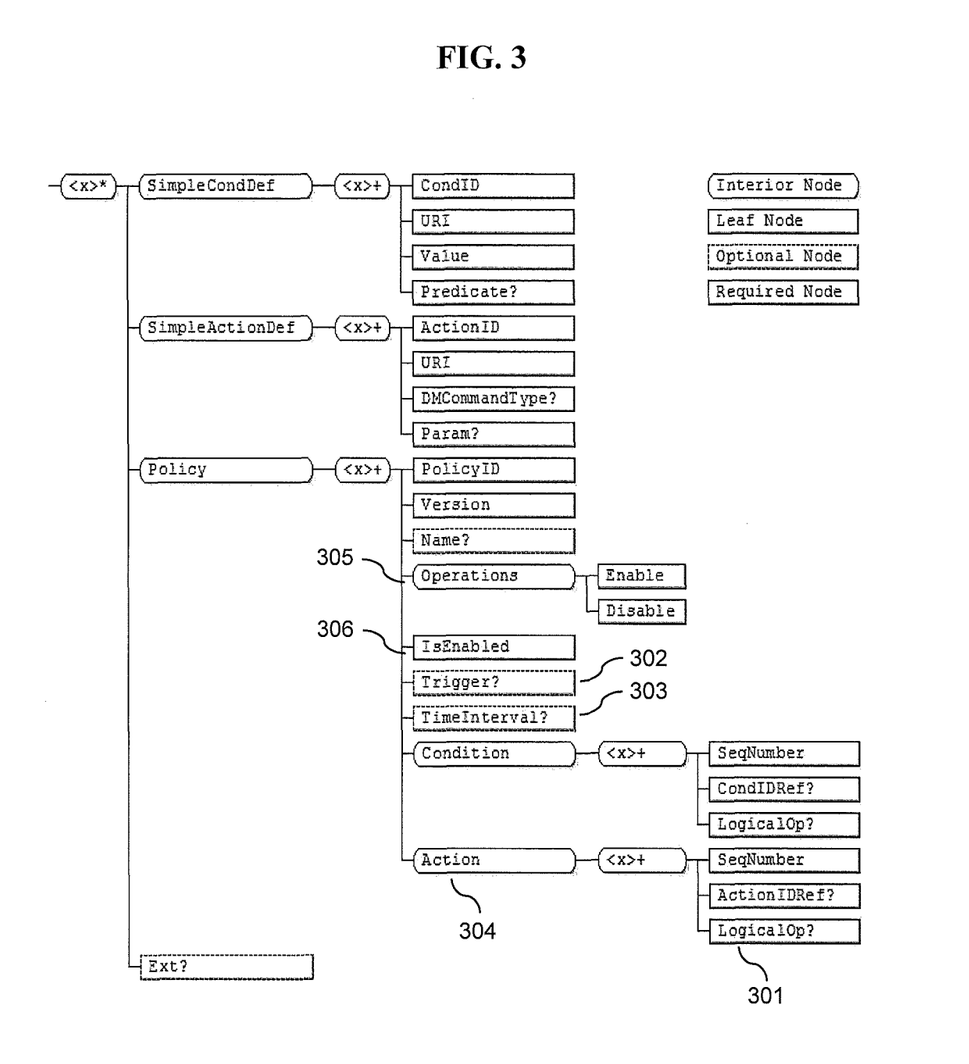
FIG. 3 shows the management tree MgmtPolicyMO extended with additional nodes created from the new features proposed by the present disclosure.

FIG. 3 shows how the management tree of MgmtPolicyMO is proposed to be extended in order to solve the problems described above, and to support the following proposed methods:

Problem 1—Execution limited to any or all of the simple actions within a compound action.

Solution 1—Use of short-circuit operators to control the activation of policies of execution of actions.

Besides the regular operators (NOT, AND, OR) defined in MgmtPolicyMO, short-circuit operators SOR and SAND are proposed as logical of Policy Action (301). Regular operators imply the implementation of all simple actions within a compound action, and they are only used to determine the result of compound action. Short-circuit Operators, instead, are actually controlling structures, adapted to interpret the results of the simple action-success (OK) or failure (NOK), as follows:

TABLE 1

| <x>/Policy/<x>/Action/<x>/LogicalOp | | | |
|---|---|---|---|
| Status | Occurrence | Format | Min. Access Types |
| Required | ZeroOrOne | int | Get |

The value of this leaf node indicates the logical operator to be used to build the compound action from simple actions. The values allowed for this node are:

TABLE 2

| Values | Meaning |
|---|---|
| 0 | NOT |
| 1 | OR |
| 2 | AND |
| 3 | SOR (*) |
| 4 | SAND (*) |

Logical operators operate on the results of simple actions: true if a simple action was successful (status code: Success - OK ) and otherwise, false (failure - NOK).
(*) New short-circuit operators, in addition to the regular operators mentioned in the prior art.

Action Operators

By applying Action Operators, the results of a simple action can be interpreted, as follows:

If a simple action results in success (OK), this action can be logically interpreted as the true Boolean result.

Otherwise, if the simple action results in failure (NOK), this can be logically interpreted as a Boolean false.

Regular Action Operators

Considering the following expressions that represent actions made based on two simple actions Action_1, Action_2 connected by regular operators:

Action_1 AND Action_2:

The expression result is success status code (OK), only if both simple actions result in success status code (OK).

Action_1 OR Action_2:

The expression result is failure status code (NOK) only if both simple actions result in failure status codes (NOK).

NOT Action_1:

The result of the expression is the success status code (OK) if Action_1 results in failure status code (NOK).

The expression result is failure status code (NOK) if Action_1 results in success status code (OK).

For regular operators, actions are performed as in a list. In this example, Action_2 is always executed regardless of the result of Action_1 and vice-versa.

Short-Circuit Action Operators

As known to those skilled in the art, the evaluation of short-circuit or minimal evaluation denotes the semantics of some Boolean operators in some programming languages in which the second argument is only executed or evaluated if the first argument is not sufficient to determine the expression value. When the first argument of the function AND evaluates as false (false), the total amount must be false, and when the first argument of the function OR evaluates as true (true), the total amount must be true.

The short-circuit term x SAND y (using SAND to describe the variety of short circuit) is equivalent to the conditional expression "if x then y else false;" expression x SOR y is equivalent to "x then true else y".

Operators are short-circuited, in fact, controlling structures, instead of simple arithmetic operators, because they are not fixed.

Considering the following expressions that represent compound actions formed by two simple actions and Action_1 Action_2 connected by short-circuit operators. The compound results of expression are defined similarly to the regular operators, but short-circuit operators can control how simple actions will be implemented, as follows:

Action_1 SAND Action_2:

The result of the expression is the success status code (OK) only if both simple actions result in success status code (OK)—the same as the logic regular operator AND.

Action_2 is only executed if Action_1 results in success status code (OK). In other words, if Action_1 results in failure status code (NOK), Action_2 is not performed (short circuit).

Action_1 SOR Action_2:

The expression result is failure status code (NOK) only if both simple actions result in failure status code (NOK)—the same as regular OR.

Action_2 is only executed if Action_1 results in failure status code (NOK). In other words, if Action_1 results in success status code (OK), Action_2 is not performed (short circuit).

Problem 2—repetitive Execution of compound actions.

Solution 2: Triggering Policy based on the results of transitions conditions.

According to an embodiment of the disclosure, this solution aims to filter excessive executions and repetitive actions and thus avoiding "flooding" the DM Server with many notifications. This is accomplished by two optional nodes: "Trigger" (302) and Time Interval "TimeInterval" (303) applied to the actions of the Policies.

TABLE 3

<x>/Policy/<x>/Trigger

| Status | Tree Occurrence | Format | Min. Access Types |
|---|---|---|---|
| Optional | ZeroOrOne | int | Get |

This leaf node indicates when to trigger the actions executions, based on the Policy conditions results and on TimeInterval constraint defined in the sibling node. If this node is missing, it has the same effect as Value=0.

TABLE 4

| Values | Meaning |
|---|---|
| 0 | Trigger action on condition result eguals to 'true' |
| 1 | Trigger PosAction on condition result transition from 'false' to |
| 2 | Trigger NegAction on condition result transition from 'true' to |
| 3 | Trigger positive or negative actions on condition result transitions from 'false' to 'true' or from 'true' to 'false', respectively. |

TABLE 5

<x>/Policy/<x>/TimeInterval

| Status | Tree Occurrence | Format | Min. Access Types |
|---|---|---|---|
| Optional | ZeroOrOne | int | Get |

This leaf node is used to define a time interval, in seconds. In conjunction with the sibling node Trigger, a Policy action is allowed to be executed only after the specified time interval, counted from the previous execution of this Policy. If the node does not exist or does not contain the positive value, no time interval restricts for the MgmtPolicyMO Client to execute the Policy.

Problem 3—Missing an "If-Else" scheme for compound actions

Solution 3—Implement If-else scheme by specializing compound actions into positive and negative actions If-Else Policy actions schema is accomplished by specializing the Action object defined in MgmtPolicyMO (304) into two independent compound actions, PosAction and NegAction. If and Else actions will be associated to positive and negative transitions of results of the policy conditions, as follows PosAction (or IfAction)—triggered on positive condition result transitions (from false to true)

NegActions (or ElseAction)—triggered on negative condition result transitions (from true to false)

TABLE 6

<x>/Policy/<x>/PosAction or IfAction

| Status | Occurrence | Format | Min. Access Types |
|---|---|---|---|
| Required | One | node | Get |

This interior node is the parent node for all the positive actions that are included in the device management policy. If transition filtering is enabled, positive actions defined under this node are executed in case of positive transitions of condition results—false to true.

TABLE 7

| <x>/Policy/<x>/NegAction or ElseAction | | | |
|---|---|---|---|
| Status | Occurrence | Format | Min. Access Types |
| Required | One | node | Get |

This interior node is the parent node for all the negative actions that are included in the device management policy. If transition filter is enabled, negative actions defined under this node are executed in case of negative transitions of condition results—true to false.

Problem 4—Management Policies are isolated and cannot be interconnected

Solution 4—Inter-dependent, linked, Management Policies

The method proposes a Management Policy action that is able to enable or disable another Management Policy. In order to allow that the Management Policy exposes the Enable and Disable Operations (305), which may be called either by the DM Server or by Management Policies installed in the device. It is possible for a Management Policy action to disable the Management Policy itself.

Besides Operation node, it is also proposed an "IsEnabled" node (306), which specifies the enable state of the Policy Management, either Enabled or Disabled.

TABLE 8

| <x>/Policy/<x>/Operations | | | |
|---|---|---|---|
| Status | Occurrence | Format | Min. Access Types |
| Required | One | node | Get |

This interior node is a parent node for operations that can be executed on a Policy.

TABLE 9

| <x>/Policy/<x>/Operations/Enable | | | |
|---|---|---|---|
| Status | Occurrence | Format | Min. Access Types |
| Required | One | null | Exec |

This node is used with Exec command to enable the Policy. Once resumed, the IsEnabled node value transits to true.

TABLE 10

| <x>/Policy/<x>/Operations/Disable | | | |
|---|---|---|---|
| Status | Occurrence | Format | Min. Access Types |
| Required | One | null | Exec |

This node is used with Exec command to disable the Policy. Once resumed, the IsEnabled node value transits to the false.

TABLE 11

| <x>/Policy/<x>/IsEnabled | | | |
|---|---|---|---|
| Status | Occurrence | Format | Min. Access Types |
| Required | One | bool | Get, Replace |

This leaf node specifies if a Policy is enabled ('true') or disabled ('false'). The Policy is disabled; no actions related to that Policy are performed.

Although an embodiment of the present disclosure has been shown and described, those skilled in the art will appreciate that various modifications can be made without departing from the scope and spirit of the invention as defined in the appended claims.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It is also expressly stated that all combinations of elements that perform the same function in substantially the same way to achieve the same results are within the scope of the disclosure.

What is claimed is:

1. A non-transitory computer-readable recording medium storing a program that, when executed by a hardware processor, causes an apparatus to perform a method for controlling an execution of a management policy, the method comprising:
    triggering and controlling an execution of a plurality of simple actions that form a compound action, so that an execution of one of the plurality of simple actions depends on a result of executing a previous simple action of the plurality of simple actions within the compound action,
    wherein the compound action includes a short-circuit operator applied to the result of executing the previous simple action in at least one of the management policy and a representation of the management policy as MgmtPolicyMO in a management Tree.

2. The non-transitory computer-readable recording medium of claim 1, wherein the execution of the one of the plurality of simple actions is triggered based on a transition of the result of executing the previous simple action, to avoid a repetitive execution of the same simple action, and to avoid flooding a Device Management (DM) Server with notifications.

3. The non-transitory computer-readable recording medium of claim 2, wherein the compound action includes an IF action and an ELSE action, for a positive transition and a negative transition, respectively.

4. The non-transitory computer-readable recording medium of claim 3, wherein the positive transition refers to a change in the result of executing the previous simple action from false to true, and the negative transition refers to a change in the result of executing the previous simple action from true to false.

5. The non-transitory computer-readable recording medium of claim 1, wherein the management policy is connected to another management policy such that a portion of the compound action resides in each of the management policies.

6. The non-transitory computer-readable recording medium of claim 1, wherein the management policy deactivates itself under specific conditions.

7. The non-transitory computer-readable recording medium of claim 6, wherein the deactivated management policy is configured to be reactivated by another management policy or a Device Management (DM) Server.

8. A remote management system comprising a Device Management (DM) server and a device, the device comprising:
a hardware processor configure for triggering and controlling an execution of a plurality of simple actions that form a compound action, so that an execution of one of the plurality of simple actions depends on a result of executing a previous simple action of the plurality of simple actions within the compound action,
wherein the compound action includes a short-circuit operator applied to the result of executing the previous simple action in at least one of the management policy and a representation of the management policy as MgmtPolicyMO in a management Tree.

9. An apparatus:
a hardware processor configure for triggering and controlling an execution of a compound action including a plurality of simple actions and a short-circuit operator, so that an execution of one of the plurality of simple actions depends on a result of executing a previous simple action of the plurality of simple actions within the compound action,
wherein the short-circuit operator is applied to the result of executing the previous simple action in at least one of a management policy and a representation of the management policy in a management Tree.

* * * * *

UNITED STATES PATENT AND TRADEMARK OFFICE
CERTIFICATE OF CORRECTION

| | |
|---|---|
| PATENT NO. | : 9,584,368 B2 |
| APPLICATION NO. | : 14/068762 |
| DATED | : February 28, 2017 |
| INVENTOR(S) | : Antonio Henrique Barbosa Postal |

Page 1 of 1

It is certified that error appears in the above-identified patent and that said Letters Patent is hereby corrected as shown below:

In the Claims

Column 12, Line 4, Claim 8: Delete "configure" and insert -- configured --, therefor.

Column 12, Line 15, Claim 9: Delete "apparatus:" and insert -- apparatus comprises: --, therefor.

Column 12, Line 16, Claim 9: Delete "configure" and insert -- configured --, therefor.

Signed and Sealed this
Ninth Day of May, 2017

Michelle K. Lee
*Director of the United States Patent and Trademark Office*